United States Patent
Palazzo

(10) Patent No.: US 7,735,526 B2
(45) Date of Patent: Jun. 15, 2010

(54) METHOD AND APPARATUS FOR REMOVING WASTE COOKING OIL

(75) Inventor: John W. Palazzo, Akron, OH (US)

(73) Assignee: Frontline International, Inc., Barberton, OH (US)

( * ) Notice: Subject to any disclaimer, the term of this patent is extended or adjusted under 35 U.S.C. 154(b) by 628 days.

(21) Appl. No.: 11/463,476

(22) Filed: Aug. 9, 2006

(65) Prior Publication Data

US 2007/0227597 A1    Oct. 4, 2007

Related U.S. Application Data

(60) Provisional application No. 60/788,146, filed on Mar. 31, 2006.

(51) Int. Cl.
B65B 1/04 (2006.01)
A47J 37/12 (2006.01)

(52) U.S. Cl. .............................. 141/1; 141/67; 141/95; 141/198; 99/408

(58) Field of Classification Search ................. 141/4–8, 141/65, 67, 94, 95, 192, 198, 387, 389, 392; 99/408; 210/167.28
See application file for complete search history.

(56) References Cited

U.S. PATENT DOCUMENTS

| | | | |
|---|---|---|---|
| 3,586,822 A | 6/1971 | Pastore | |
| 3,649,290 A | 3/1972 | Angold | |
| 3,866,472 A | 2/1975 | Witt | |
| 3,938,744 A * | 2/1976 | Allen | 241/46.11 |
| 4,148,729 A | 4/1979 | Howard | |
| 4,282,094 A * | 8/1981 | Mitchell | 210/167.28 |
| 4,485,831 A * | 12/1984 | Ungerleider | 137/1 |
| 4,508,026 A | 4/1985 | Anetsberger et al. | |
| 4,646,793 A * | 3/1987 | Sherratt | 141/1 |
| 5,159,962 A | 11/1992 | Dow | |
| 5,243,898 A | 9/1993 | Sakuma | |
| 5,249,511 A * | 10/1993 | Shumate et al. | 99/408 |
| 5,340,471 A * | 8/1994 | Wilson et al. | 210/167.28 |
| 5,417,851 A * | 5/1995 | Yee | 210/167.01 |
| 5,433,846 A | 7/1995 | Roshanravan | |
| 5,586,486 A | 12/1996 | Nitschke et al. | |
| 5,597,601 A * | 1/1997 | Griffin | 426/417 |
| 5,609,193 A * | 3/1997 | Steckler | 141/231 |
| 5,812,060 A * | 9/1998 | DeSpain et al. | 340/618 |
| 5,839,360 A * | 11/1998 | Williams | 99/408 |
| 5,908,551 A * | 6/1999 | Onken | 210/184 |
| 6,157,776 A | 12/2000 | Onken | |
| 6,330,852 B1 * | 12/2001 | Williams | 99/408 |
| 6,981,531 B1 | 1/2006 | Palazzo | |
| 2004/0058043 A1 | 3/2004 | More | |

FOREIGN PATENT DOCUMENTS

EP   0 296 549   12/1988
EP   1180492   8/2001

* cited by examiner

*Primary Examiner*—Timothy L Maust
(74) *Attorney, Agent, or Firm*—Buckingham, Doolittle & Burroughs, LLP

(57) ABSTRACT

A new and improved method and apparatus for removing waste cooking oil is herein disclosed. A method for removing waste cooking oil from an associated cooking oil reservoir includes providing a pumping mechanism, wherein the pumping mechanism has tubing operatively connected to the pumping mechanism and a suction apparatus operatively connected to the tubing, providing a waste oil storage unit, turning on a pump, inserting the suction apparatus into the associated reservoir, the suction apparatus being located remotely from the waste oil storage unit, and depressing a trigger to activate the suction apparatus to remove the waste cooking oil from the associated reservoir.

11 Claims, 17 Drawing Sheets

Figure 1:
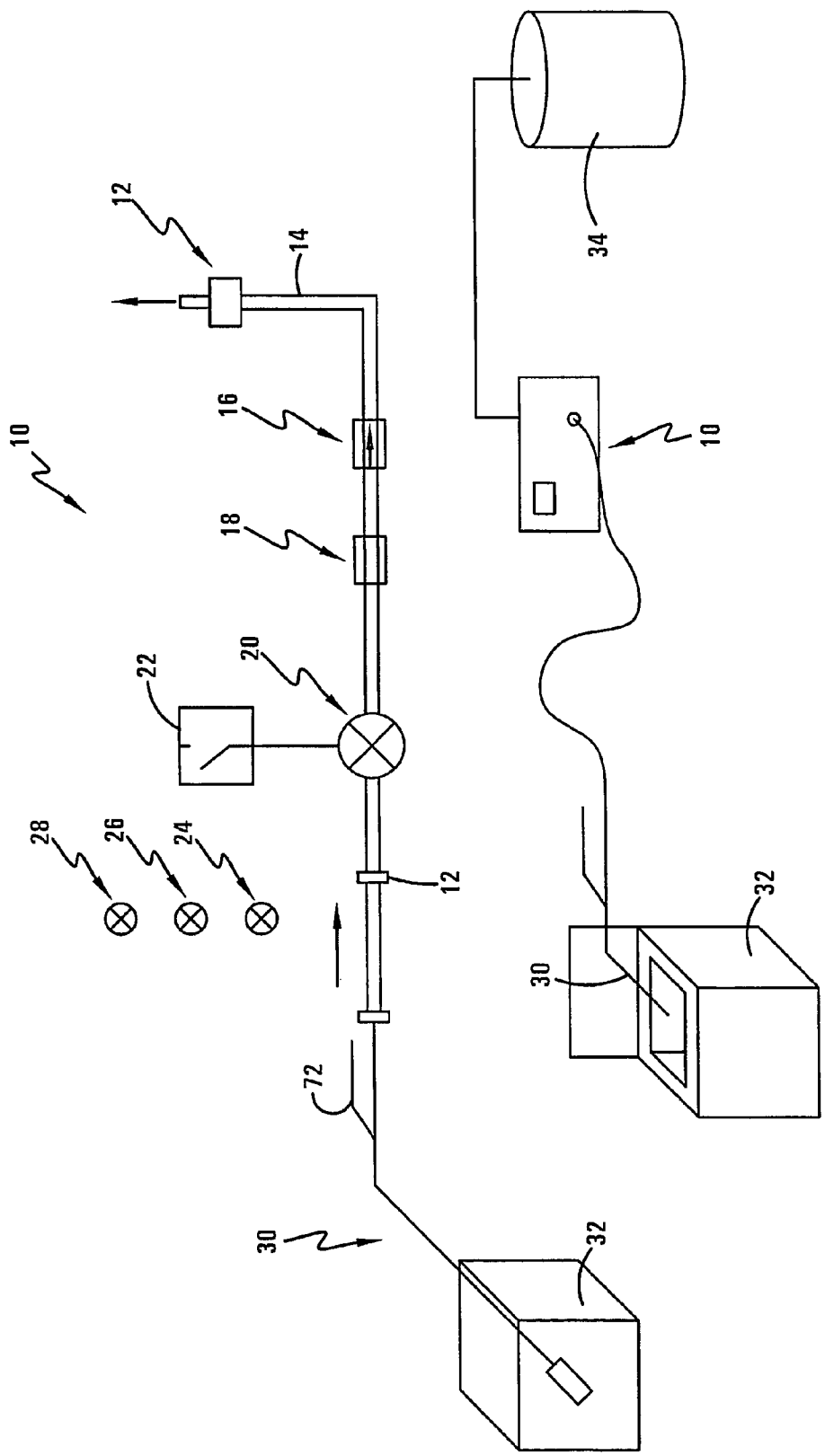

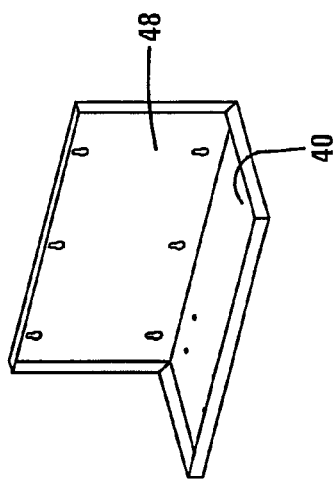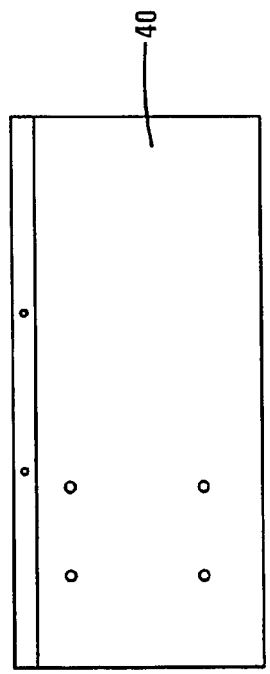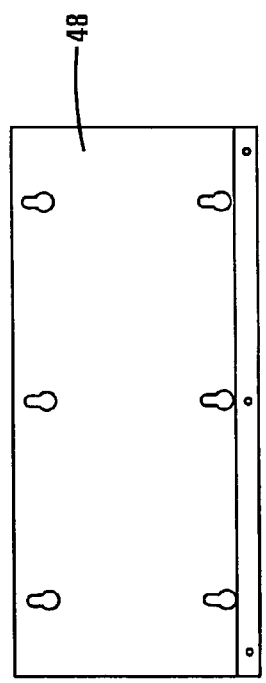
FIG-9

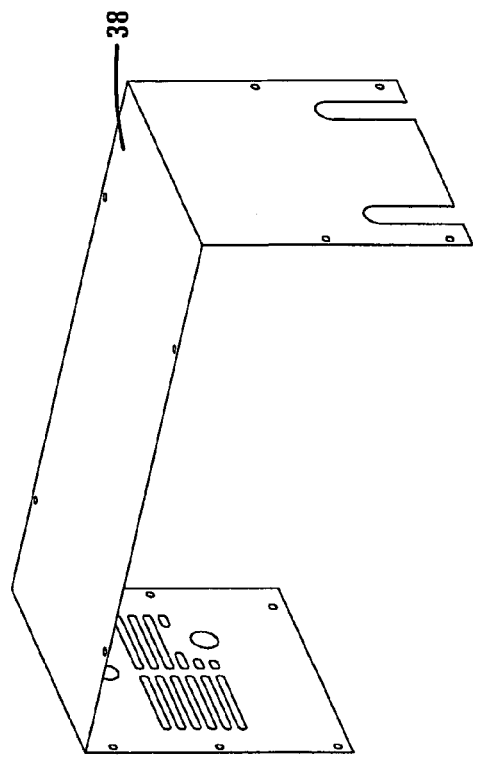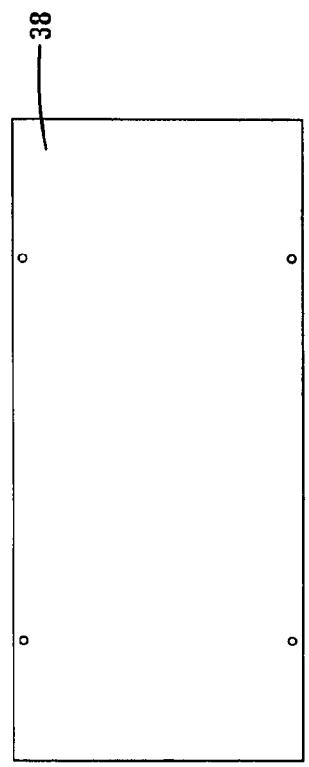
FIG-12

METHOD AND APPARATUS FOR REMOVING WASTE COOKING OIL

This application claims priority to U.S. Ser. No. 60/788,146, entitled Method And Apparatus For Removing Waste Cooking Oil, filed Mar. 31, 2006.

I. BACKGROUND OF THE INVENTION

A. Field of Invention

The present invention relates to an oil removing device, more particularly to a cooking oil removing device, and even more particularly to a portable waste cooking oil removal device.

B. Description of the Related Art

Currently, waste oil is stored in drums or other temporary receptacles, often outside the back door of the premises. This presents an unsightly and dangerous hazard, which is compounded by spills causing slippery areas that are almost impossible to clear, creating odors and mess.

The present invention provides methods and apparatuses for a portable and/or remote system for removing waste cooking oil. The difficulties inherit in the art are therefore overcome in a way that is simple and efficient, while providing better and more advantageous results. The present invention is related to the invention in U.S. Pat. No. 6,981,531 (Method and Apparatus for Waste Oil Management), the contents of which are incorporated herein by reference.

II. SUMMARY OF THE INVENTION

According to one aspect of the present invention, the pumping mechanism is a helical pump.

In accordance with another aspect of the present invention, the inventive system is used to pump used oil from the fryer to a holding tank.

In accordance with another aspect of the present invention, the pumping mechanism can interface with a remote tank.

In accordance with another aspect of the present invention, the system allows easy, efficient, remote removal of waste cooking oil.

In accordance with another aspect of the present invention, a control panel allows the user to know how full the tank is.

In accordance with another aspect of the present invention, a method for removing waste cooking oil from an associated cooking oil reservoir includes providing a pumping mechanism, wherein the pumping mechanism has tubing operatively connected to the pumping mechanism and a suction apparatus operatively connected to the tubing, providing a waste oil storage unit, turning on a pump, inserting the suction apparatus into the associated reservoir, the suction apparatus being located remotely from the waste oil storage unit, and depressing a trigger to activate the suction apparatus to remove the waste cooking oil from the associated reservoir.

In accordance with another aspect of the present invention, the suction apparatus is a hand-held device.

In accordance with another aspect of the present invention, the waste oil storage unit is located outside of a room wherein the reservoir is located.

In accordance with another aspect of the present invention, the pump is located remotely from the suction apparatus.

In accordance with another aspect of the present invention, a fluid removal apparatus includes a pump, a motor, the motor operatively connected to the pump, tubing, the tubing operatively connected to the pump, a suction apparatus, wherein the suction apparatus is located remotely from the pump, and a trigger, the trigger operatively connected to the suction apparatus.

In accordance with another aspect of the present invention, the tubing is at least ten feet long.

In accordance with another aspect of the present invention, the apparatus further includes a pressure relief valve and a check valve.

In accordance with another aspect of the present invention, the pump and motor are located within a container and the suction apparatus is located outside the container.

In accordance with another aspect of the present invention, the pump is a helical pump.

In accordance with another aspect of the present invention, the apparatus further includes a fluid storage tank, the fluid storage tank being located remotely from the pump and the suction apparatus.

In accordance with another aspect of the present invention, the apparatus further includes a control panel, the control panel comprising an on/off switch and at least one level indicator for the level of fluid in the storage tank.

In accordance with another aspect of the present invention, the control panel is selectively removable.

In accordance with another aspect of the present invention, a method for removing fluid from an associated reservoir includes providing a pumping mechanism, wherein the pumping mechanism has tubing operatively connected to the pumping mechanism and a suction apparatus operatively connected to the tubing, providing a fluid storage unit, turning on a pump, inserting the suction apparatus into the associated reservoir, the suction apparatus being located remotely from the storage unit, and depressing a trigger to activate the suction apparatus to remove the fluid from the associated reservoir.

Still other benefits and advantages of the invention will become apparent to those skilled in the art to which it pertains upon a reading and understanding of the following detailed specification.

III. BRIEF DESCRIPTION OF THE DRAWINGS

Figure 2:
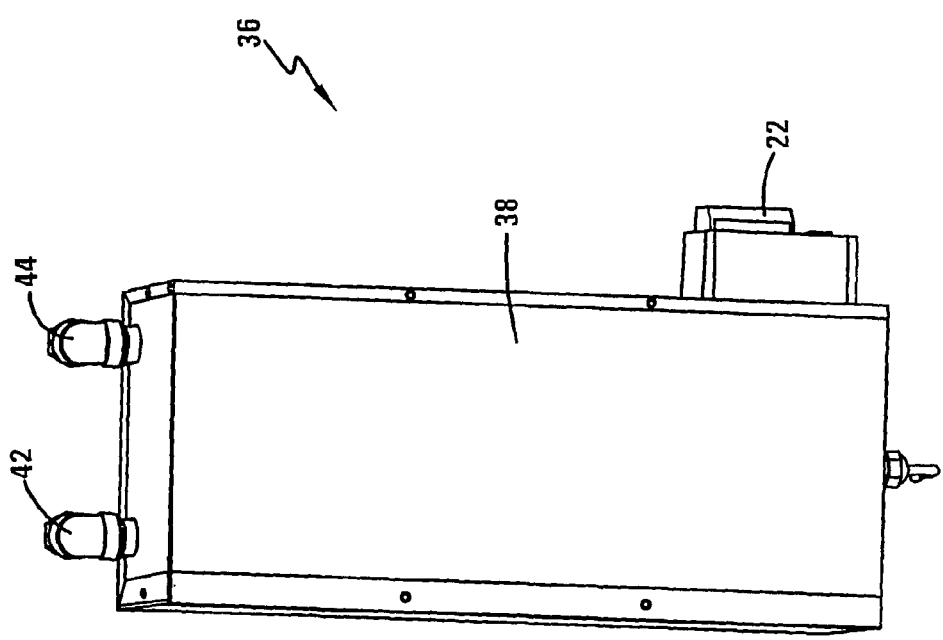
Figure 3:
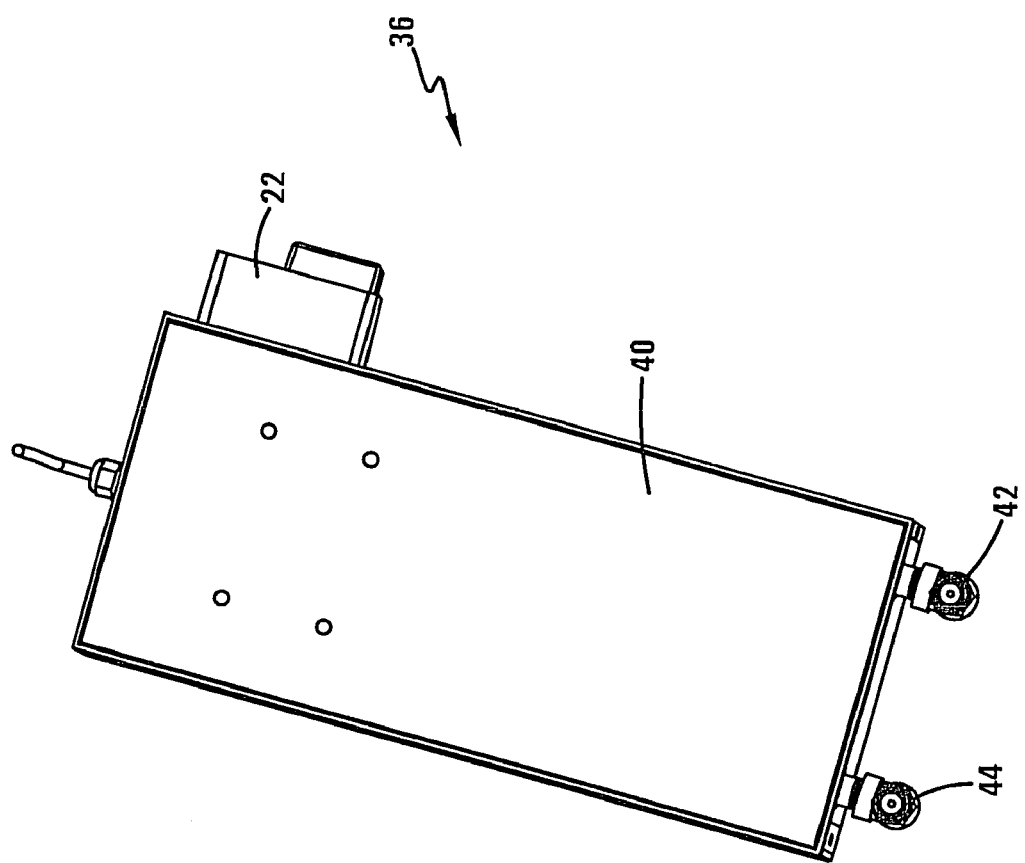
Figure 4:
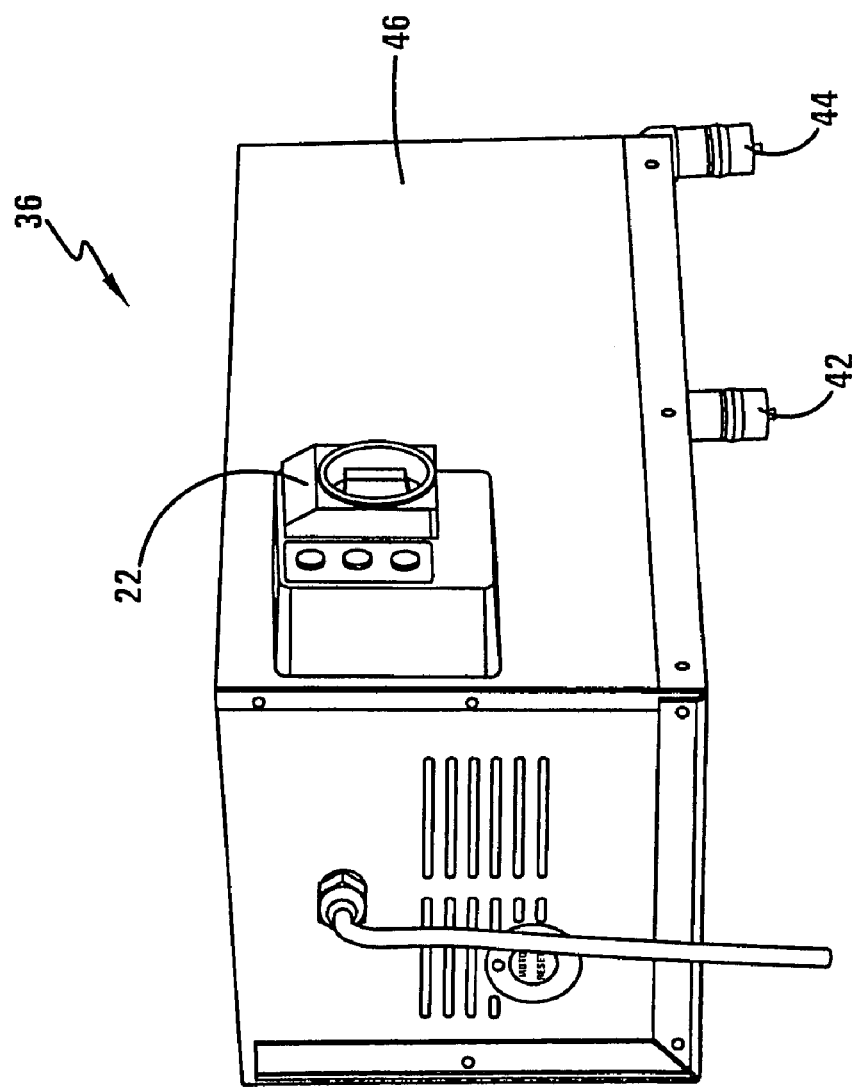
Figure 5:
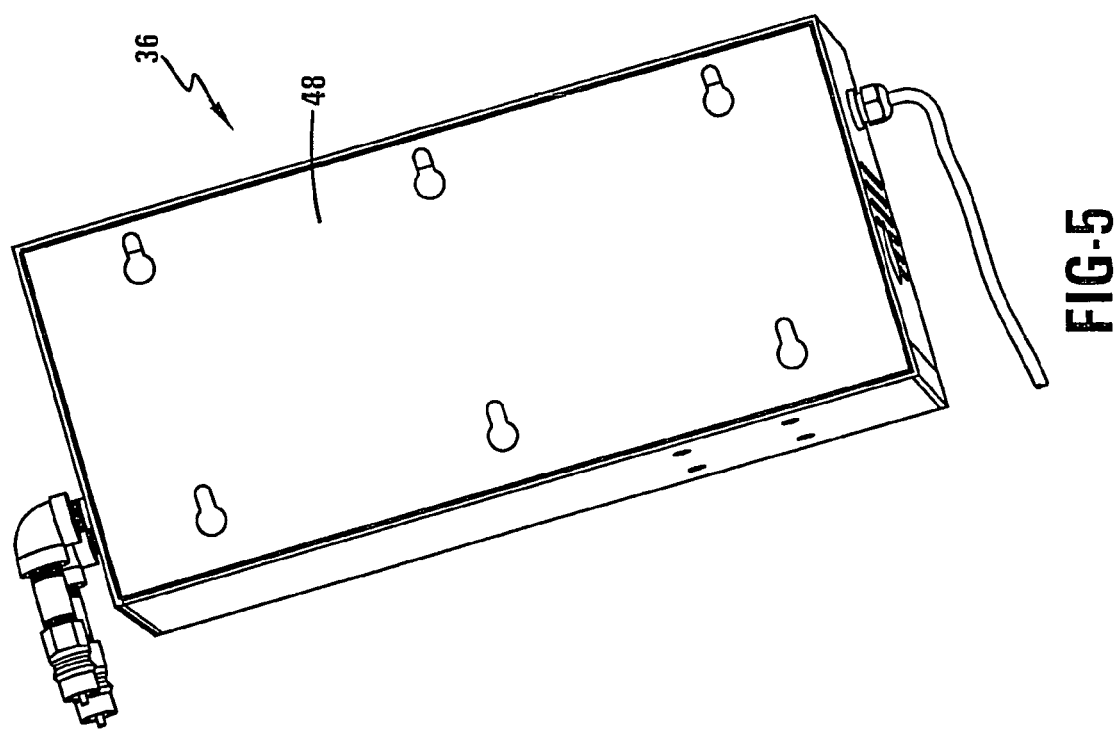
Figure 6:
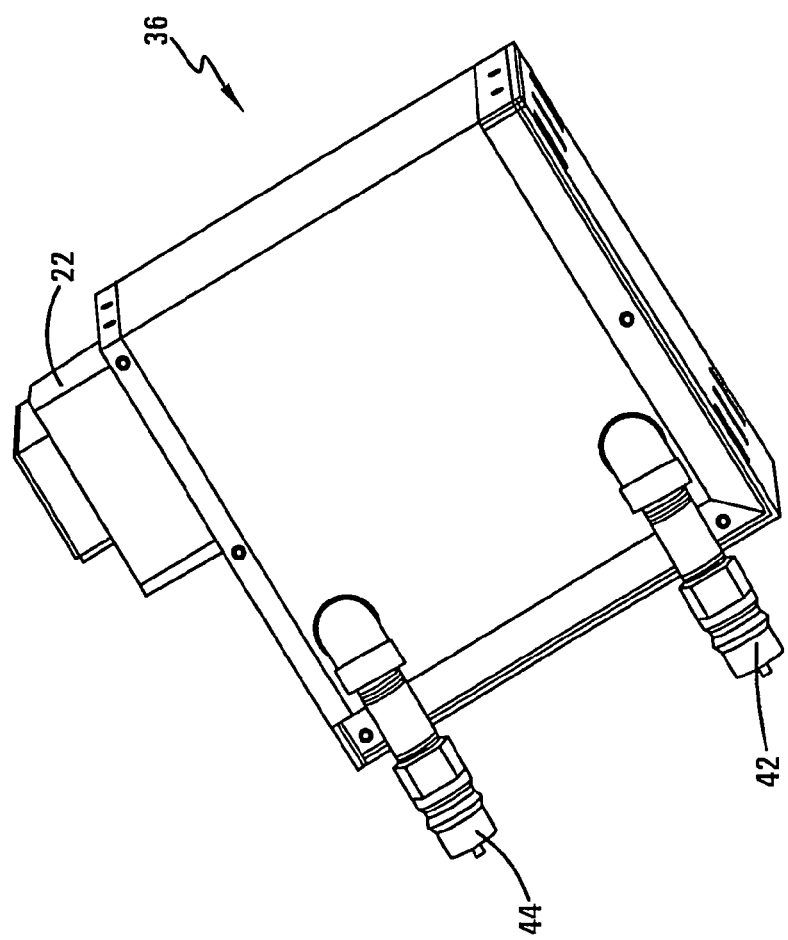
Figure 7:
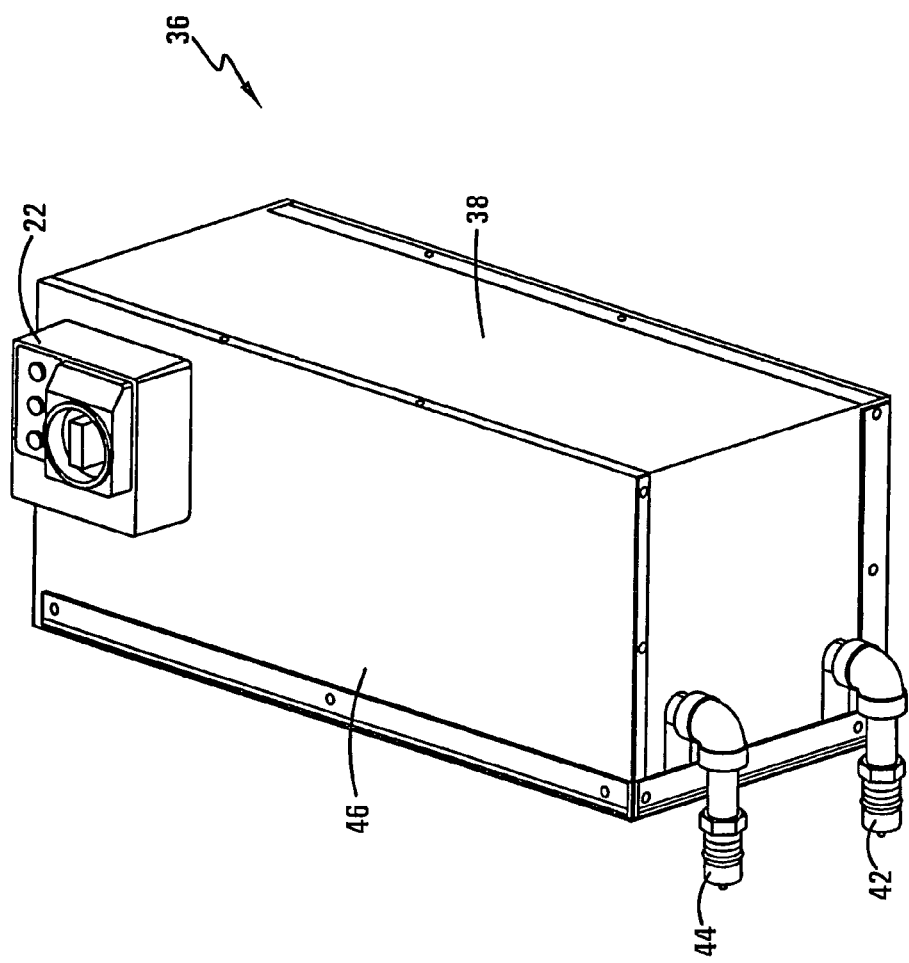
Figure 8:
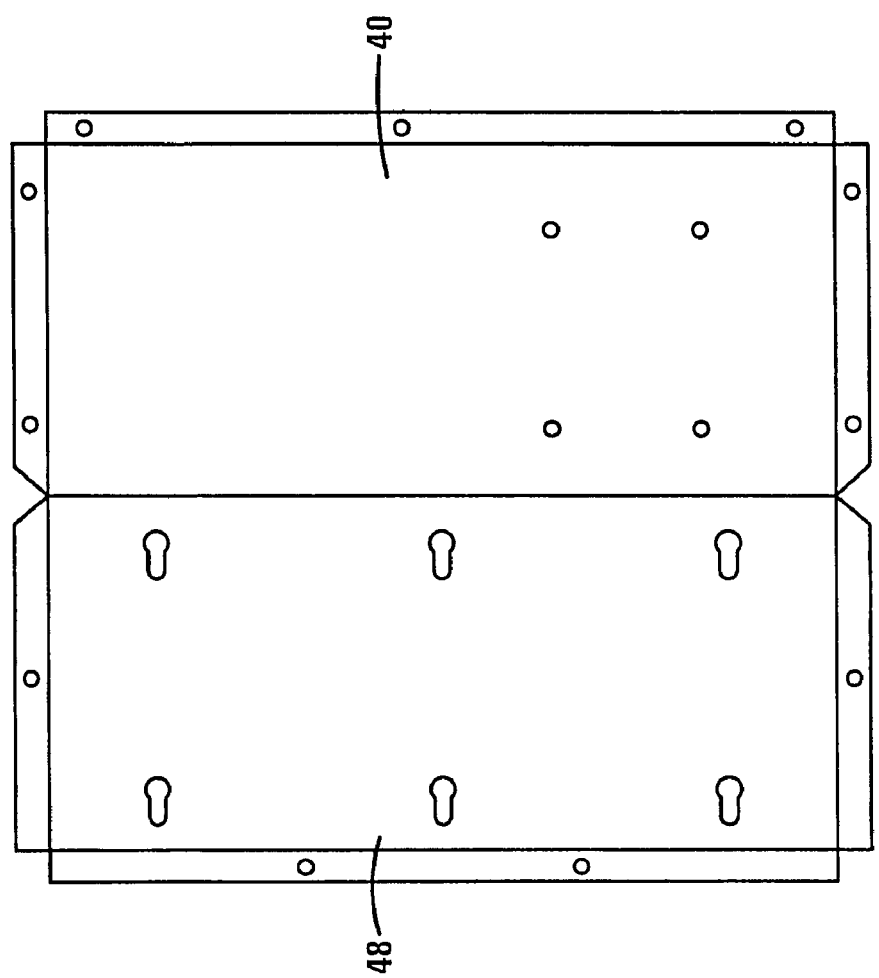
Figure 10:
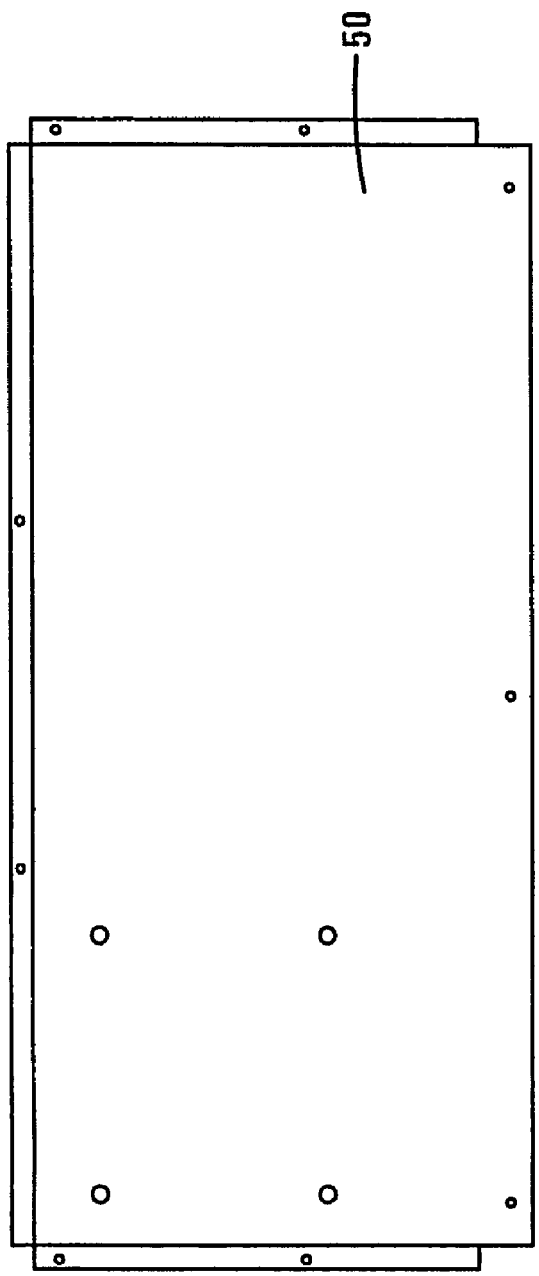
Figure 11:
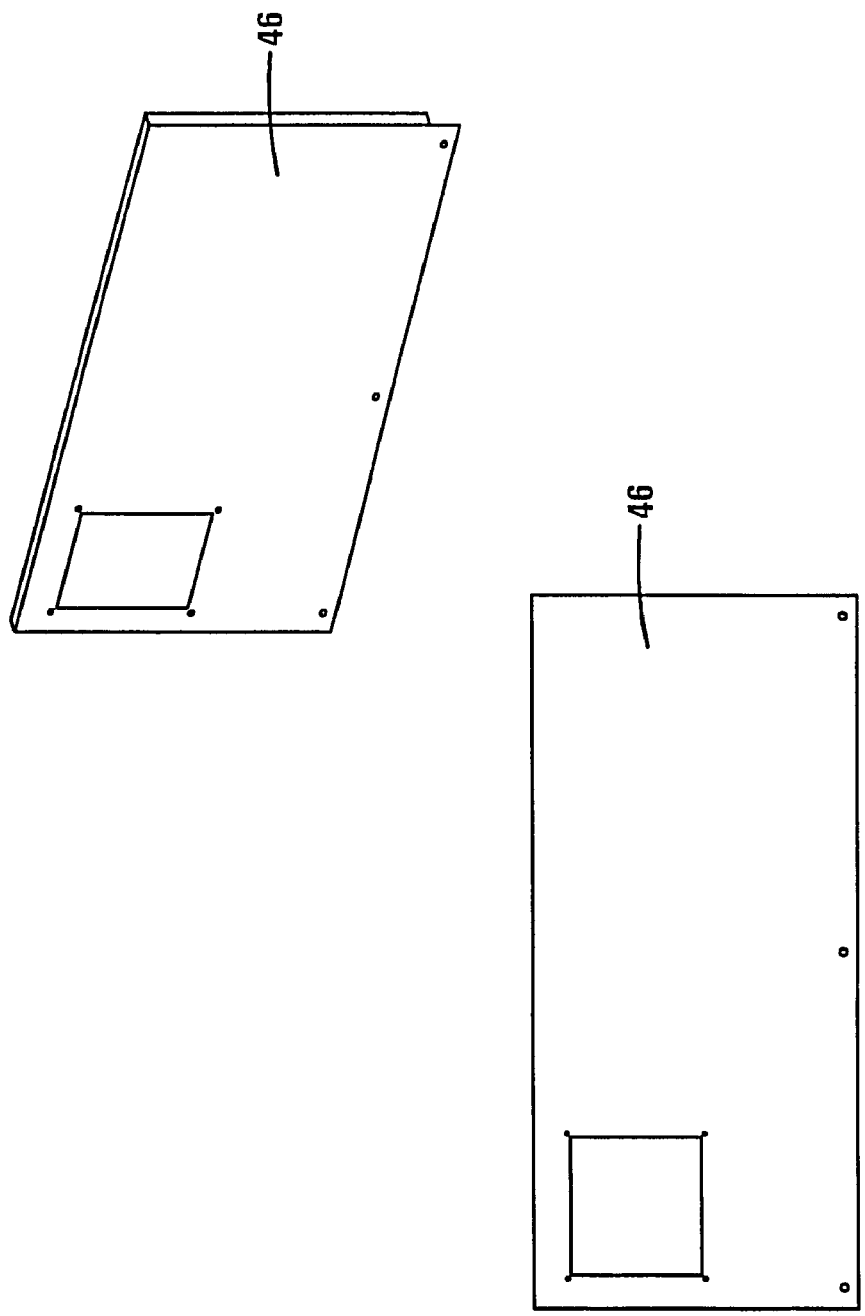
Figure 13:
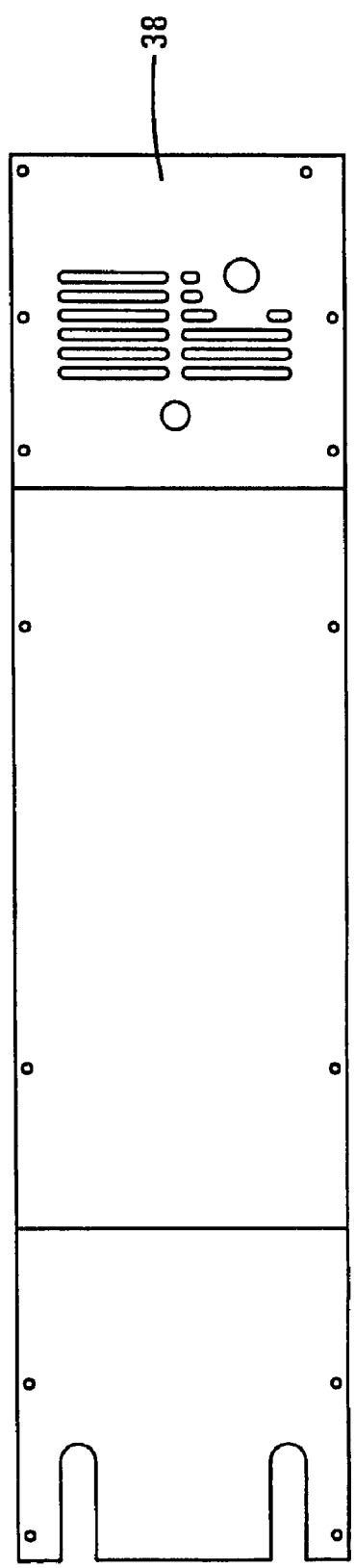
Figure 14:
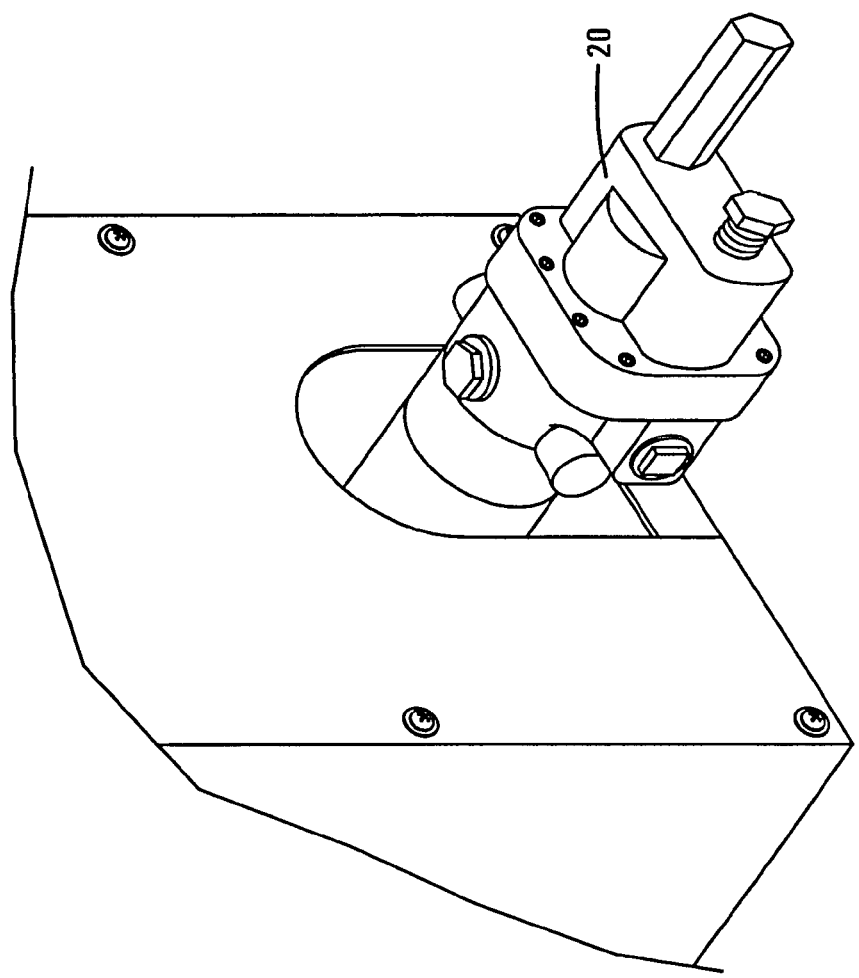
Figure 15:
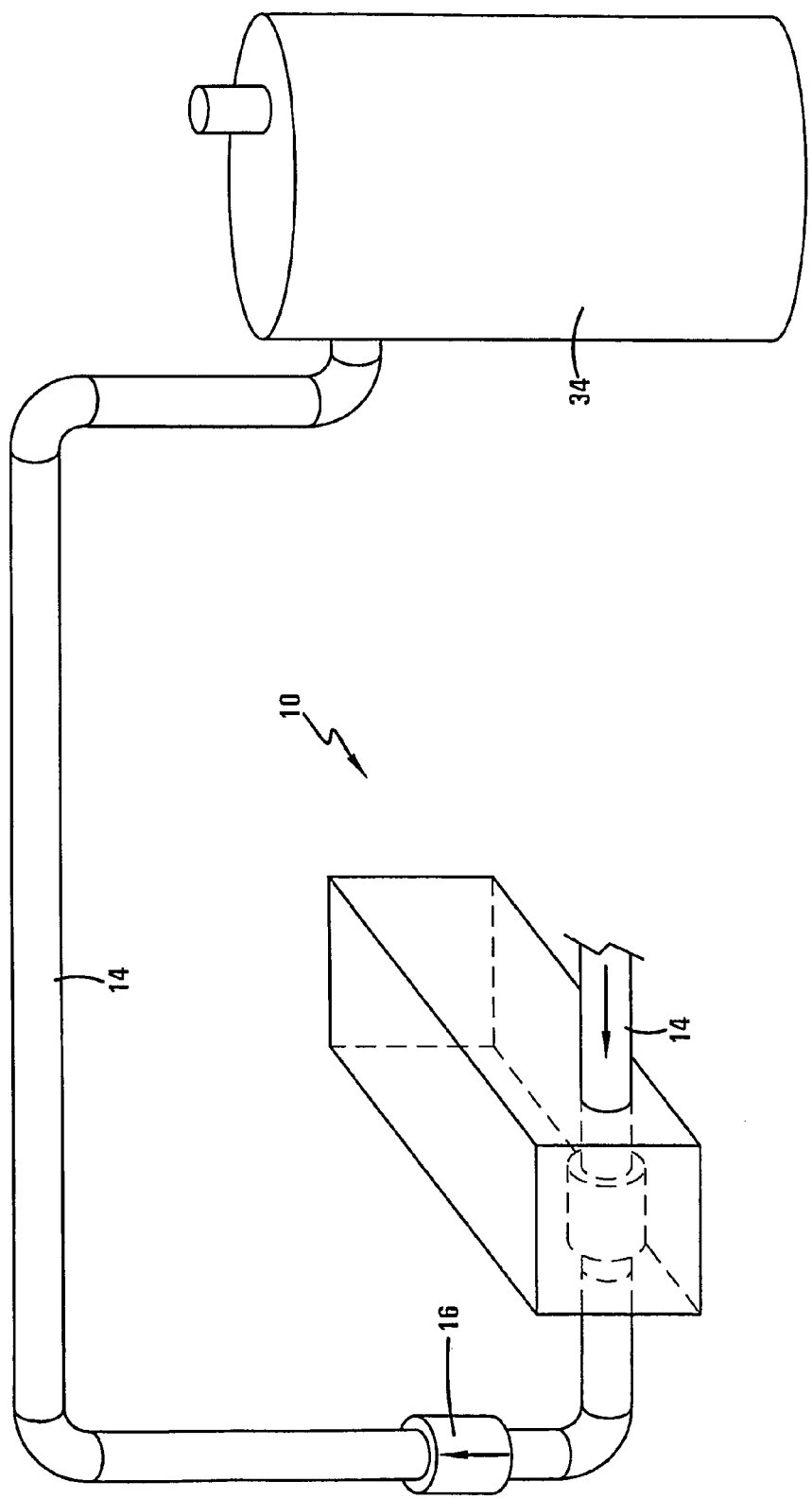
Figure 16:
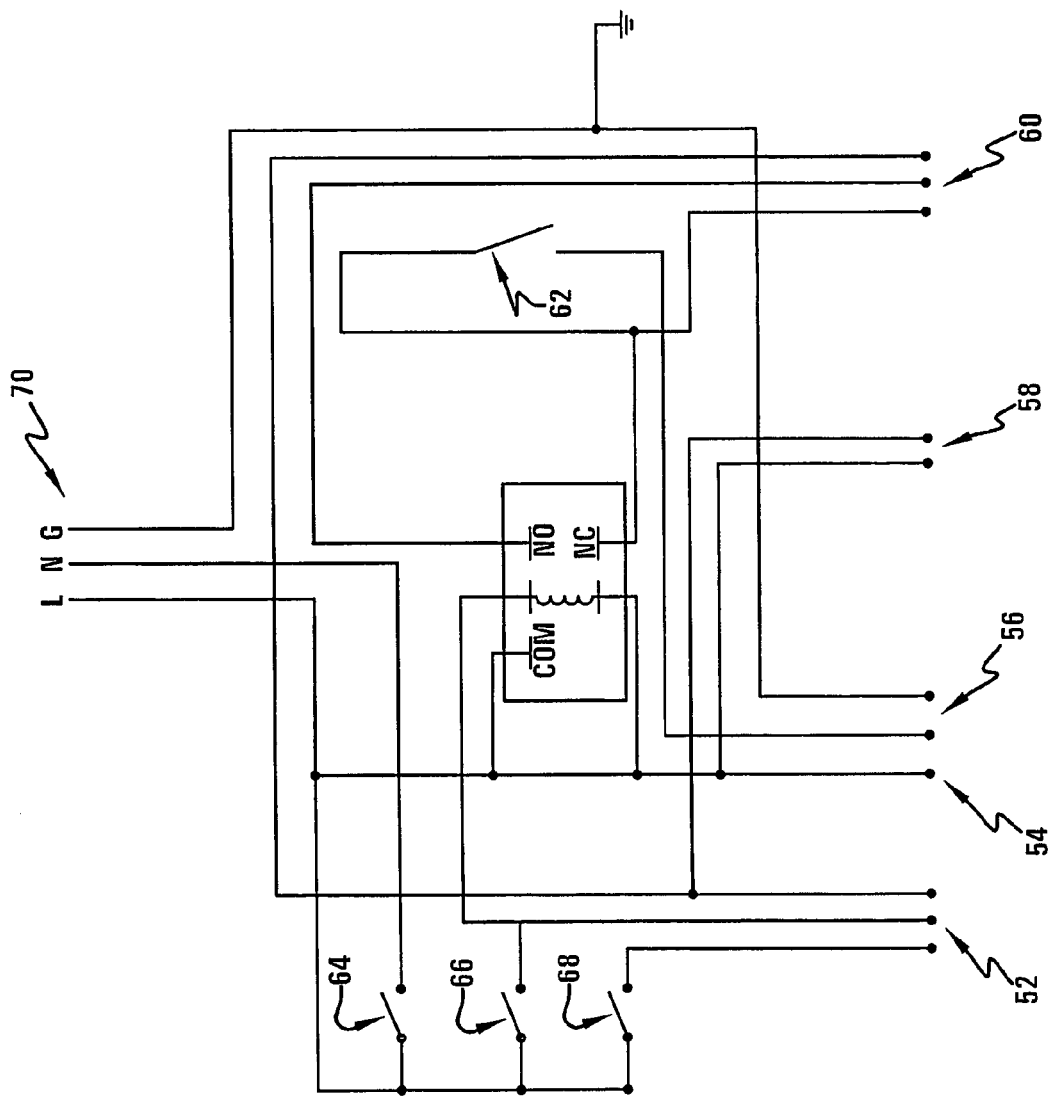
Figure 17:
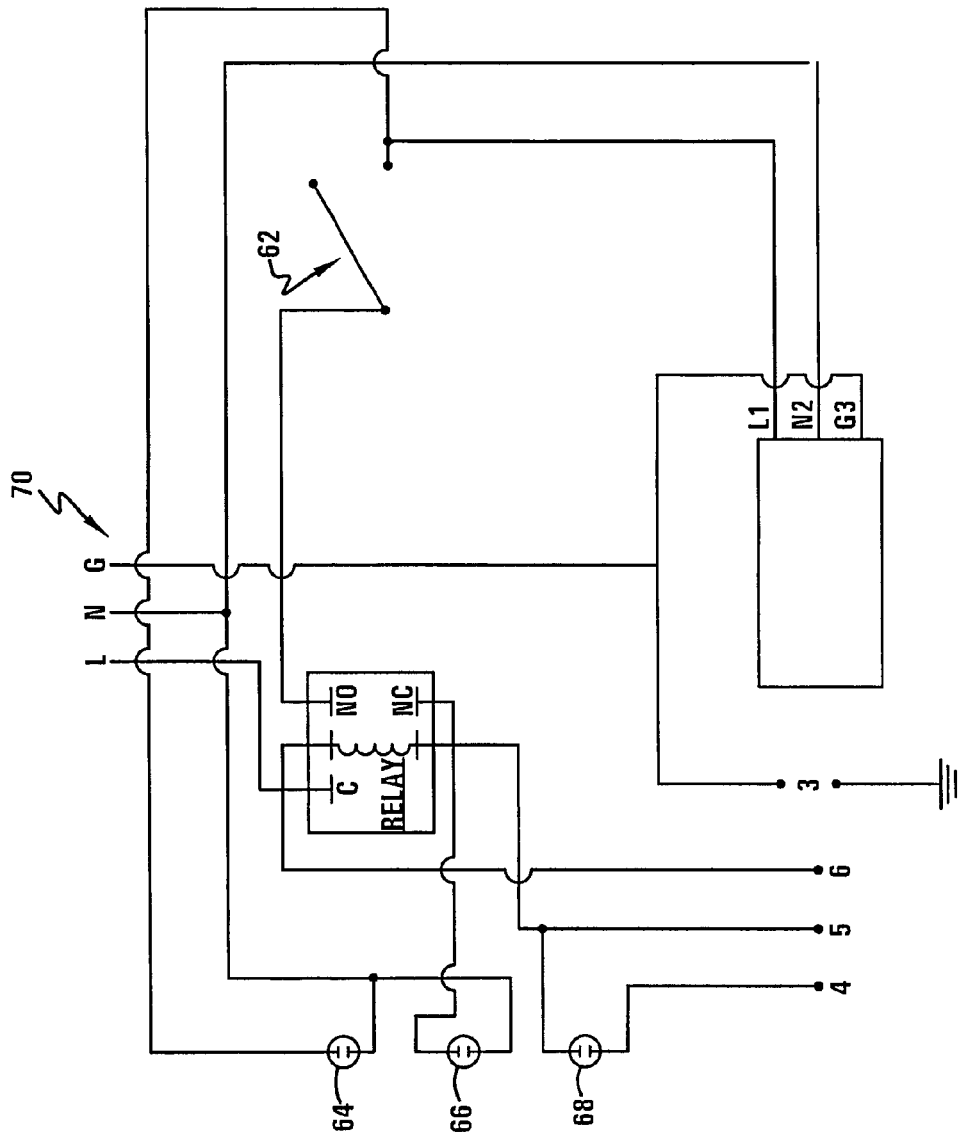

The invention may take physical form in certain parts and arrangement of parts, at least one embodiment of which will be described in detail in this specification and illustrated in the accompanying drawings which form a part hereof and wherein:

FIG. 1 shows a diagram of the inventive system;
FIG. 2 shows a perspective view of the waste oil box;
FIG. 3 shows another perspective view of the waste oil box;
FIG. 4 shows another perspective view of the waste oil box;
FIG. 5 shows another perspective view of the waste oil box;
FIG. 6 shows another perspective view of the waste oil box;
FIG. 7 shows another perspective view of the waste oil box;
FIG. 8 shows a flat view of the base of the waste oil box;
FIG. 9 shows a perspective view of the base;
FIG. 10 shows a flat view of the face of the waste oil box;
FIG. 11 shows a perspective view of the face;
FIG. 12 shows a perspective view of the cover of the waste oil box;
FIG. 13 shows a flat view of the cover;
FIG. 14 shows a photograph of the waste oil box and the wand;
FIG. 15 shows a diagram of the pumping station and the storage tank;
FIG. 16 shows a circuit diagram for electronics on the pumping station; and,
FIG. 17 shows a circuit diagram for electronics on the tank.

IV. DESCRIPTION OF THE INVENTION

Referring now to at least one embodiment of the invention, FIG. 1 shows a diagram of the pump station 10, as well as the remote tank 34. FIG. 1 shows a wand (also referred to as a suction apparatus) 30, an oil fryer (or fluid reservoir) 32, a hose (or tubing) 14, disconnect fittings 12, a pump 20, a control panel 22, a pressure relief valve 18, and a check valve 16. In this embodiment, the control panel 22 has power light 28, a "tank full" light 26, and a "call for pick up" light 24.

With reference to FIGS. 2-15, the waste oil box (or container) 36 has a top 38, a front 46, a bottom 40, a control panel 22, an inlet 42, and an outlet 44. The waste oil box 36 contains the pump 20, the pressure relief valve 18, the check valve 16, and the electrical wiring for the control panel 22. The wand 30 is connected to the box 36 by hose 14, which is connected to the inlet 42. The hose 14 that is connected to the storage tank 34 is connected to the box 36 via the outlet 44.

With reference now to FIGS. 1-17, the wand 30 is connected to the hose 14, and the wand 30 has a trigger 72 on the handle (shown but not referenced) which controls the sucking force of the wand 30 in removing the waste cooking oil from the oil reservoir 32. The hose 14 is connected to a disconnect fitting 12, which in turn is connected to the pump 20. Connected to the pump 20 are a pressure relief valve 18 and a check valve 16, which help prevent an excess of pressure from building up in the system and causing damage. Another hose 14 comes out of the waste oil box 36 and is connected to a disposal unit, which could be a tank caddy or a remote tank.

The process begins with the used cooking oil in an oil reservoir 32. The waste oil box 36 can be located at the back of the restaurant and the wand 30 can be connected to the waste oil box 36 by a sufficiently long hose 14 in order for the wand 30 to reach to the oil reservoir 32. Once the wand 30 has been inserted into the used cooking oil, the pump 20 is turned on and the oil is sucked out of the reservoir 32. The pump 20 can also be turned on prior to the wand 30 being inserted in the cooking oil, and the trigger 72 on the wand 30 will activate the suction of the wand 30. The pumping system 10 has a filtering system (not shown) in order to prevent blockages from pieces of food or other debris in the used oil. The control panel 22, which can be located on the waste oil box 36 or at a remote site, or can be left off entirely, enables the user to determine whether the oil storage unit 34 is full or not. A "tank full" light 26 on the control panel 22 will enable the user to determine when it is time to empty the oil storage unit 34. The control panel 22 is removable and can be detached and transferred from one device to another. In one embodiment, the storage tank 34 is remotely located from the box 36 and the wand 30. While the process is occurring, the storage tank 34, pump 20, and wand 30 could all be in different rooms.

With reference now to FIGS. 16 and 17, a wiring schematic shows level switch 52, power wiring 54, pump station power wiring 56, tank power wiring 58, valve power wiring 60, switch 62, green light 64, red light 66, orange light 68, and power in 70. The operation of the wiring within the invention is well known in the art, and will not be further described herein.

Although the previous embodiment has been described in terms of cooking oil, it is to be understood that the inventive system could be used in the dispensing of any type of fluid. It is also to be understood that the materials from which the wand 30, oil reservoir 32, hose 14, disconnect fittings 12, pump 20, power source, control panel 22, pressure relief valve 18, and check valve 16 are made is not critical to the invention, and any material, chosen using sound engineering judgment can be used.

At least one embodiment has been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

I claim:

1. A method for removing waste cooking oil from an associated cooking oil reservoir, the method comprising the steps of:
   providing a pumping mechanism, wherein the pumping mechanism has tubing operatively connected to the pumping mechanism and a suction apparatus operatively connected to the tubing;
   providing a waste oil storage unit with a removable control panel, wherein the removable control panel is transferred from one waste oil storage unit to another waste oil storage unit to determine whether the waste oil storage units are full;
   turning on a helical pump;
   inserting the suction apparatus into the associated reservoir, the suction apparatus being located remotely from the waste oil storage unit; and,
   depressing a trigger to activate the suction apparatus to remove the waste cooking oil from the associated reservoir.

2. The method of claim 1, wherein the suction apparatus is a hand-held device.

3. The method of claim 2, wherein the waste oil storage unit is located outside of a room wherein the reservoir is located.

4. The method of claim 3, wherein the helical pump is located remotely from the suction apparatus.

5. A method for removing fluid from an associated reservoir, the method comprising the steps of:
   providing a pumping mechanism, wherein the pumping mechanism has tubing operatively connected to the pumping mechanism and a suction apparatus operatively connected to the tubing;
   providing a fluid storage unit with a removable control panel, wherein the removable control panel is transferred from one fluid storage unit to another fluid storage unit to determine whether the fluid storage units are full;
   turning on a helical pump;
   inserting the suction apparatus into the associated reservoir, the suction apparatus being located remotely from the storage unit; and,
   depressing a trigger to activate the suction apparatus to remove the fluid from the associated reservoir.

6. The method of claim 5, wherein the suction apparatus is a hand-held device.

7. The method of claim 6, wherein the storage unit is located outside of a room wherein the reservoir is located.

8. The method of claim 7, wherein the helical pump is located remotely from the suction apparatus.

9. The method of claim 8, wherein the helical pump and motor are located within a container and the suction apparatus is located outside the container.

10. The method of claim 9, wherein the pumping mechanism further comprises:
    a pressure relief valve; and,
    a check valve.

11. The method of claim 10, wherein the fluid is waste cooking oil.

* * * * *